April 6, 1954 — L. H. GARDNER — 2,674,266
SUPPLY AND EXHAUST VALVE FOR SERVOMOTORS
Filed Sept. 9, 1948
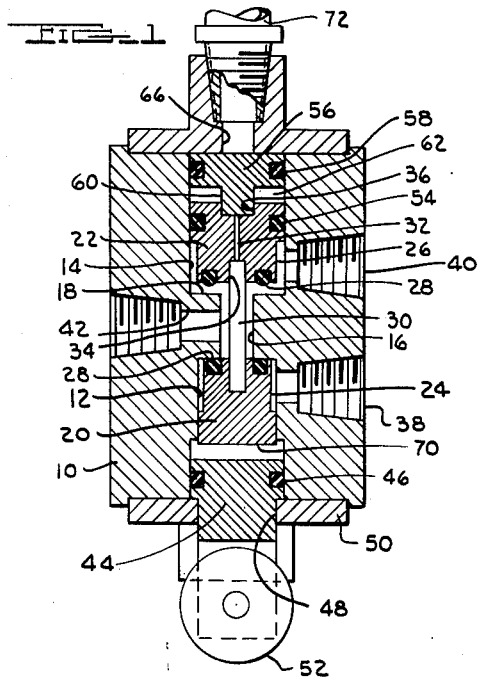
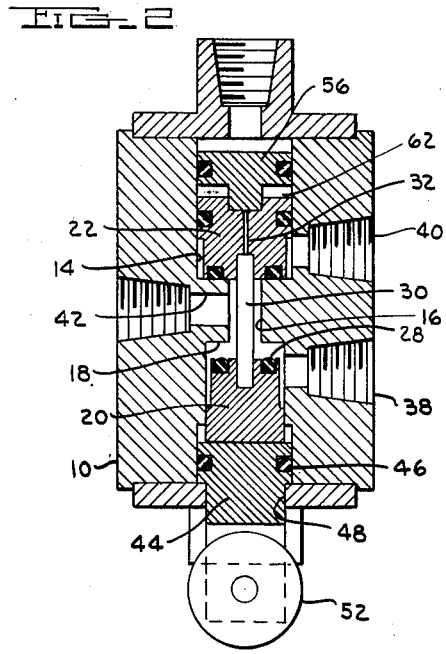
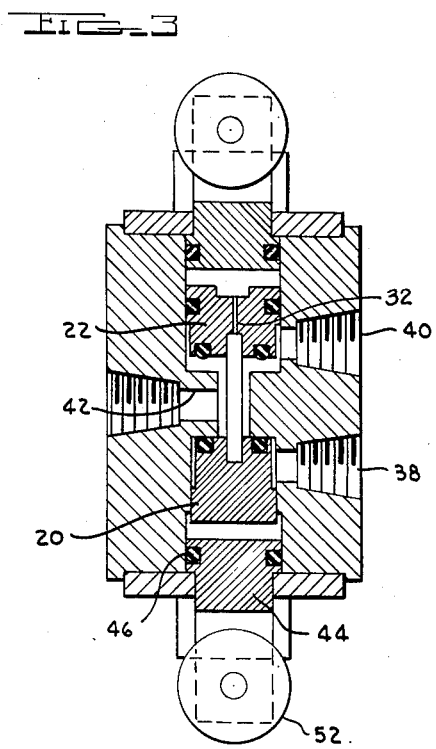
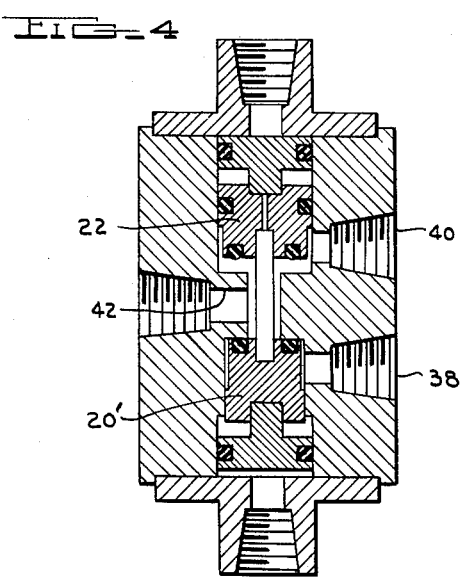
*INVENTOR.*
LAWRENCE H. GARDNER
BY
*ATTORNEY*

Patented Apr. 6, 1954

2,674,266

UNITED STATES PATENT OFFICE 2,674,266

SUPPLY AND EXHAUST VALVE FOR SERVOMOTORS

Lawrence H. Gardner, Lakewood, Ohio

Application September 9, 1948, Serial No. 48,459

6 Claims. (Cl. 137—620)

This invention relates to valve structures and has particular reference to a valve structure for controlling the supply and exhaust of pressure fluid to and from a work cylinder and which valve incorporates provisions whereby the valve will automatically maintain its setting.

A principal object of the invention is to provide a new and improved valve structure of the character herein disclosed.

Another object of the invention is to provide a valve structure of the character herein disclosed with means for automatically holding and maintaining such valve in the position in which it is set.

Other and further objects of the invention will be apparent from the following description and claims and will be understood by reference to the accompanying drawing, of which there is one sheet, which by way of illustration shows preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings:

Fig. 1 is a vertical sectional view of a valve structure embodying the invention in one position thereof;

Fig. 2 is a view similar to Fig. 1 but with the parts in a different position;

Fig. 3 is a view similar to Fig. 1 illustrating a modified form of the invention wherein the valve is mechanically actuated; and Fig. 4 is a view similar to Fig. 1 illustrating a further modification of the invention wherein the valve is fluid pressure operated.

As illustrated in Figs. 1 and 2, the valve structure comprises a valve body 10 having aligned valve cylinders 12 and 14 with a port 16 therebetween. The opposed end walls of the cylinders 12 and 14 form annular valve seats 18 around the port 16. A piston valve member 20 is reciprocably arranged in the valve cylinder 12 and a piston valve member 22 is reciprocably arranged in the valve cylinder 14. The valve members 20 and 22 have portions 24 and 26 of reduced diameter and cross section as compared with the diameter and cross section of the cylinders 12 and 14, and each of such reduced portions is provided on one face thereof with an O-ring 28 arranged in a groove in the face of the piston valve member and adapted in one position of the piston valve member to seat in port closing relation with the valve seat 18 in such cylinder and in the other position thereof to be unseated with respect to such valve seat.

As shown in Fig. 1, the piston valve member 20 is seated on its seat 18 in the cylinder 12 around the port 16 while the valve member 22 is unseated with respect to its seat 18.

As shown in Fig. 2, the piston valve member 22 is seated on its seat in port closing relation with the valve seat in the cylinder 14 while the piston valve member 20 is unseated with respect to its seat 18.

A rod 30 extends through the port 16 and is connected at one end to the piston valve member 20 within the valve seat engaging portion thereof. The piston valve member 22 as illustrated is provided with an axial duct or bore 32 terminating in one face of the piston valve member in a socket 34 and terminating in the opposite face of the piston valve member in a socket 36. The other end of the rod 30 has a slip fit in the socket 34.

The cylinder 12 is provided with a pressure fluid inlet 38 which opens into the side wall of the cylinder 12 adjacent its valve seat 18 and opposite the reduced portion 24 of the piston valve member 20. The valve cylinder 14 is provided with an outlet or exhaust 40 which opens into the side wall of the valve cylinder 14 adjacent its valve seat 18 and opposite the reduced portion 26 of the piston valve member 22.

The valve body is provided with a fluid flow passage 42 which communicates with the port 16 between the ends thereof. The passage 42 is adapted to be connected to a work cylinder to conduct pressure fluid thereto and therefrom under the control of the piston valve members 20 and 22. As illustrated in Fig. 1, the piston valve member 20 is seated and hence its pressure fluid inlet 38 is shut off from the passage 42, while the piston valve member 22 is unseated with respect to its valve seat and hence the passage 42 is in communication with the port 16, and the cylinder 14 with the exhaust or outlet port 40.

In Fig. 2 the piston valve member 22 is seated on its valve seat while the piston valve member 20 is unseated, so as shown in Fig. 2 the passage 42 is in communication with the inlet 38 whereby pressure fluid may flow from the inlet 38 through the valve cylinder 12 and port 16 into the passage 42.

The end of the valve cylinder 12 opposite the valve seat 18 is closed by a piston 44, the peripheral surface of which is provided with an O-ring 46 arranged in a groove thereof so as to form a sliding seal between the piston 44 and the wall of the cylinder 12. The piston 44 projects through a guide surface 48 formed in the plate 50 secured to the end of the valve body, and the outwardly projecting stem of the piston 44 is bifurcated and carries a wheel or roller 52 for engagement by a suitable actuator, such as a cam. The main part of the piston 20 which has a sliding fit in the cylinder 12 has a clearance of the order of .003 in. to .005 in. between itself and the wall of the cylinder 12 so as to permit pressure fluid to flow past the head of the piston 20 and into the space in the valve cylinder 12 between the head of the piston valve member 20 and the head of the piston 44. In this way when the parts are arranged as illustrated in Fig. 1, the pressure of the fluid at the inlet 38 is transmitted through the clearance between the piston valve member 20 and the wall of the cylinder 12 to the face of the piston valve member 20 opposite to the valve engaging portion thereof so as to hold the piston valve member 20 seated on its seat.

The rod 30 is of such length that when the piston valve member 20 is seated on its valve seat the piston valve member 22 is unseated and the port 16 is in communication with the outlet 40. The duct 32 provides a fluid passage between the valve seat engaging face of the piston valve member 22 and the opposite face thereof. An O-ring 54 arranged in an annular groove in the periphery of the piston valve member 22 establishes a sliding seal between the piston valve member 22 and the wall of the cylinder 14. A piston 56 forms a sliding closure for the end of the valve cylinder 14 opposite the valve seat 18 and is provided in its periphery with an annular groove in which an O-ring 58 is arranged and which O-ring forms a sliding seal with the wall of the cylinder 14. The piston 56 has a central projection 60 which has a loose fit in the socket 36. The space between the piston 56 and the piston valve member 22 forms a chamber 62 which through the duct 32 communicates with the cylinder 14 on the other side of the piston valve member 22 and the port 16.

When fluid under pressure is supplied through the port 66 to the piston 56, the piston 56 will shift the piston valve member 22 to the position as illustrated in Fig. 2 and simultaneously therewith the rod 30 will shift the piston valve member 20 to its unseated position. This act will close the communication between the passage 42 and the outlet 40 and open the communication between the passage 42 and the inlet 38 whereby pressure fluid will flow to the passage 42 from the inlet 38. At the same time pressure fluid will pass through the loose fit between the rod 30 and the socket 34 into the duct 32 and through the socket 36 into the chamber 62. Assuming that the supply of pressure fluid through the port 66 is only momentary and is then released, the flow of pressure fluid through the duct 32 will shift the piston 56 to the upper end of the cylinder 14 and fill the chamber 62, thereby reacting on the rear face of the piston valve member 22 to hold the same seated on its seat 18, the reduced portion 26 of the piston valve member 22 being at this time in communication with the outlet 40.

The pressure in the chamber 62 will continue to maintain the piston valve member 22 seated and the piston valve member 20 unseated until the piston 44 is actuated to seat the piston valve member 20 and unseat the piston valve member 22. The cam (not shown) may be engaged with the roller 52 to move the piston 44 against the piston valve member 22 and thereby move the same to its seated position, and at the same time the rod 30 will unseat the piston valve member 22.

As previously described, the pressure from the inlet 38 acting on the rear face 70 of the piston 20 will function to hold the piston valve member 20 seated and the piston valve member 22 unseated.

A conduit 72 may be connected to the port 66 for supplying fluid pressure to the piston momentarily at such time as it is desired to close the communication between the passage 42 and the outlet 40.

In the structure shown in Figs. 1 and 2 the piston valve member 20, which may be considered as the inlet valve, is mechanically or cam actuated, whereas the piston valve member 22, which may be considered as the exhaust valve, is pressure fluid operated.

In the modification shown in Fig. 3 the valve structure is arranged so that both the inlet valve 20 and the exhaust valve 22 are mechanically actuated by an arrangement like that illustrated in connection with the inlet valve 20 as shown in Figs. 1 and 2, whereas in Fig. 4 both the inlet valve 20' and the exhaust valve 22 are fluid pressure operated by an arrangement like that illustrated for closing exhaust valve 22 as shown in Figs. 1 and 2. The structures illustrated in Figs. 3 and 4 are otherwise the same as that shown in Figs. 1 and 2.

The valve structures herein disclosed are, by way of example, suitable for use in connection with bottling machines and hobbing machines. In bottling machines the bottle holding table is rotatable with the top clamping table which loads the bottles. The type of valve herein disclosed may be located on the top table and connected to the loading cylinder which also holds the flexible tube for connection with the neck of the bottle. The top table may have superimposed thereon a stationary wheel having two opposite cams spaced 180° apart with one of the cams facing inwardly and the other outwardly. As the table unit rotates with the valve, the valve contacts the outer fixed cam and is actuated momentarily, and the valve setting will remain until reversed by the inner cam.

The principal feature of the valve structure resides in the provisions whereby it holds and maintains its setting until a subsequent actuation.

While I have illustrated and described preferred embodiments of my invention, it is understood that these are capable of modification, and I therefore do not wish to be limited to the precise details set forth but desire to avail myself of such changes and alterations as fall within the purview of the following claims.

I claim:

1. Valve structure comprising a valve body having aligned cylinders with a port therebetween and a valve seat in each of said cylinders around said port, a piston valve member reciprocably arranged in one cylinder and having a portion of reduced cross section adapted in one position of said piston valve member to seat in port closing relation with the valve seat in such cylinder and in the other position thereof to be unseated with respect to such valve seat, a second piston valve member reciprocably arranged in the other cylinder and adapted in one position thereof to seat in port closing relation with the valve seat in such cylinder and in the other position thereof to be unseated with respect to such valve seat, a rod extending through said port and connected at one end to said piston valve member in said one cylinder within the valve seat engaging portion thereof, said second piston valve member within the valve seat engaging portion thereof having a socket within which the other end of said rod has a slip fit, said one cylinder having a pressure fluid inlet in the side wall adjacent its valve seat and said other cylinder having a fluid outlet in its side wall adjacent its valve seat, said rod being of such length that when said piston valve member in said one cylinder is seated on its valve seat the other piston valve member is unseated and said port is out of communication with said inlet and in communication with said outlet, said valve body having a fluid flow passage communicating with said port between the ends thereof and through which passage the flow of pressure fluid is to be controlled, a third piston valve member in said other cylinder, said second piston valve member having a bore therethrough terminating at one end in said socket and at its other end in a socket in the opposite face thereof, said third piston valve member having a part having a loose fit in said last-mentioned socket and being spaced in said other cylinder from said second piston valve member so as to define a chamber therebetween, said sockets and bore being constructed and arranged so as to permit flow of fluid under pressure from said port to said chamber when said piston valve member in said one cylinder is unseated from its seat and said second piston valve member is seated on its seat so as to hold said piston valve member in said one cylinder unseated and said piston valve member in said other cylinder seated, means engageable with said piston valve member in said one cylinder for moving the same to its seat and thereby unseating said second piston valve member and actuating means for moving said third piston valve member into engagement with said second piston valve member for moving said second piston valve member to its seat and thereby unseating said piston valve member in said one cylinder.

2. Valve structure according to claim 1 wherein said piston valve member in said one cylinder has a sliding fit therein which transmits pressure fluid to said cylinder on the face of the piston valve member therein opposite the valve seat engaging portion thereof and wherein such face exposed to such pressure fluid is greater than the face of said piston valve member exposed to pressure fluid on the inlet side of said cylinder when said piston valve member is seated on its valve seat.

3. Valve structure comprising a valve body having a pair of valve cylinders with a port therebetween and a valve seat in each of said cylinders around said port, a piston valve member reciprocably arranged in one cylinder and adapted in one position thereof to seat in port closing relation with the valve seat in such cylinder and in the other position thereof to be unseated with respect to such valve seat, a second piston valve member reciprocably arranged in the other cylinder and adapted in one position thereof to seat in port closing relation with the valve seat in such cylinder and in the other position thereof to be unseated with respect to such valve seat, a rod extending through said port and connected at one end to said piston valve member in said one cylinder, said second piston valve member having a duct therethrough terminating at one end within the valve seat engaging portion thereof and at the other end on the opposite face of said second piston valve member, the other end of said rod being engageable with said second piston valve member adjacent said one end of said duct and operable for regulating the flow of fluid therethrough, said one cylinder having a fluid inlet in the side wall adjacent its valve seat and said other cylinder having a fluid outlet in its side wall adjacent its valve seat, said rod being of such length that when said piston valve member in said one cylinder is seated on its valve seat the other piston valve member is unseated and said port is out of communication with said inlet and in communication with said outlet, said valve body having a fluid flow passage and through which passage the flow of pressure fluid is to be controlled communicating with said port between the ends thereof, said other cylinder having a chamber to which is exposed the face of said second piston valve member opposite the valve seat engaging portion thereof and in which face the other end of said duct terminates, said duct permitting flow of fluid under pressure from said port to said chamber when said piston valve member in said one cylinder is unseated from its seat and said second piston valve member is seated on its seat so as to hold said piston valve member in said one cylinder unseated and said piston valve member in said other cylinder seated, means engageable with said piston valve member in said one cylinder for moving the same to its seat and thereby unseating said second piston valve member and other means engageable with said second piston valve member for moving said second piston valve member to its seat and thereby unseating said piston valve member in said one cylinder.

4. Valve structure comprising a valve body having a pair of valve cylinders with a port therebetween and a valve seat in each of said cylinders around said port, a piston valve member reciprocably arranged in one cylinder and adapted in one position thereof to seat in port closing relation with the valve seat in such cylinder and in the other position thereof to be unseated with respect to such valve seat, a second piston valve member reciprocably arranged in the other cylinder and adapted in one position thereof to seat in closing relation with the valve seat in such cylinder and in the other position thereof to be unseated with respect to such valve seat, motion transmitting means connected at one end to said piston valve member in said one cylinder, said second piston valve member being engageable by the other end of said motion transmitting means so that movement of said second piston valve member to valve seating position will unseat the other piston valve member from its valve seat, said one cylinder having a fluid inlet in the side wall adjacent its valve seat and said other cylinder having a fluid outlet in its side wall adjacent its valve seat, said motion transmitting means being of such length that when said piston valve member in said one cylinder is seated on its valve seat the other piston valve member is unseated and said port is out of communication with said inlet and in communication with said outlet, said valve body having a fluid flow passage communicating with said port between the ends thereof and through which passage the flow of pressure fluid is to be controlled, said second piston valve member having a duct therethrough terminating at one end within the valve seat engaging portion thereof and at its other end in the opposite face thereof, a chamber in said other piston valve cylinder in communication with said duct and exposed to the face of said second piston valve member opposite the valve seat engaging portion thereof, said duct providing for flow of pressure fluid from said port to said chamber when said piston valve member in said one cylinder is unseated from its seat and said second piston valve member is seated on its seat so as to hold said piston valve member in said one cylinder unseated and said piston valve member in said other cylinder seated, means engageable with said piston valve member in said one cylinder for moving the same to its seat and thereby unseating said second piston valve member and other means engageable with said second piston valve member for moving said second piston valve member to its seat and thereby unseating said piston valve member in said one cylinder.

5. Valve structure comprising a valve body having a pair of cylinders with a port therebetween and a valve seat in each of said cylinders around said port, a piston valve member reciprocably arranged in one cylinder and adapted in one position thereof to seat in port closing relation with the valve seat in such cylinder and in the other position thereof to be unseated with respect to such valve seat, a second piston valve member reciprocably arranged in the other cylinder and adapted in one position thereof to seat in closing relation with the valve seat in such cylinder and in the other position thereof to be unseated with respect to such valve seat, a rod extending through said port and between said piston valve members, said one cylinder having a fluid inlet in the side wall adjacent its valve seat and said other cylinder having a fluid outlet in its side wall adjacent its valve seat, said rod being of such length that when said piston valve member in said one cylinder is seated on its valve seat the other piston valve member is unseated and said port is out of communication with said inlet and in communication with said outlet, said valve body having a fluid flow passage communicating with said port between the ends thereof, means reciprocably arranged in said one cylinder engageable with said piston valve member in said one cylinder for moving the same to its seat and thereby unseating said second piston valve member and other means reciprocably arranged in said other cylinder engageable with said second piston valve member for moving said second piston valve member to its seat and thereby unseating said piston valve member in said one cylinder, and means supplied with pressure fluid operable for holding one of said piston valve members on its seat and the other of said piston valve members unseated, each of said reciprocable means being operable independently of the other reciprocable means.

6. Valve structure comprising a valve body having a pair of valve cylinders with a port therebetween and a valve seat in each of said cylinders around said port, a piston valve member reciprocably arranged in one cylinder and adapted in one position thereof to seat in port closing relation with the valve seat in such cylinder and in the other position thereof to be unseated with respect to such valve seat, a second piston valve member reciprocably arranged in the other cylinder and adapted in one position thereof to seat in port closing relation with the valve seat in such cylinder and in the other position thereof to be unseated with respect to such valve seat, a rod extending through said port and connected at one end to said piston valve member in said one cylinder, means providing a passage between end portions of said other cylinder separated by said second piston valve member, the other end of said rod being engageable with said second piston valve member and operable for controlling the flow of fluid through said passage so as to subject the side of said second piston valve member opposite the valve seat engaging portion thereof to pressure when said second piston valve member is seated in order to maintain said second piston valve member seated, said one cylinder having a fluid inlet in the side wall adjacent its valve seat and said other cylinder having a fluid outlet in its side wall adjacent its valve seat, said rod being of such length that when said piston valve member in said one cylinder is seated on its valve seat the other piston valve member is unseated and said port is out of communication with said inlet and in communication with said outlet, said valve body having a fluid flow passage and through which passage the flow of pressure fluid is to be controlled communicating with said port between the ends thereof, means engageable with said piston valve member in said one cylinder for moving the same to its seat and thereby unseating said second piston valve member and other means engageable with said second piston valve member for moving said second piston valve member to its seat and thereby unseating said piston valve member in said one cylinder.

References Cited in the file of this patent

UNITED STATES PATENTS

| Number | Name | Date |
|---|---|---|
| 1,420,663 | Maxwell | June 27, 1922 |
| 1,728,855 | Cook | Sept. 17, 1929 |
| 2,300,263 | McLeod | Oct. 27, 1942 |
| 2,441,201 | Ludwig | May 11, 1948 |